March 30, 1948.    V. F. OSTLER    2,438,677
TIRE CASING VULCANIZER
Filed Dec. 29, 1945
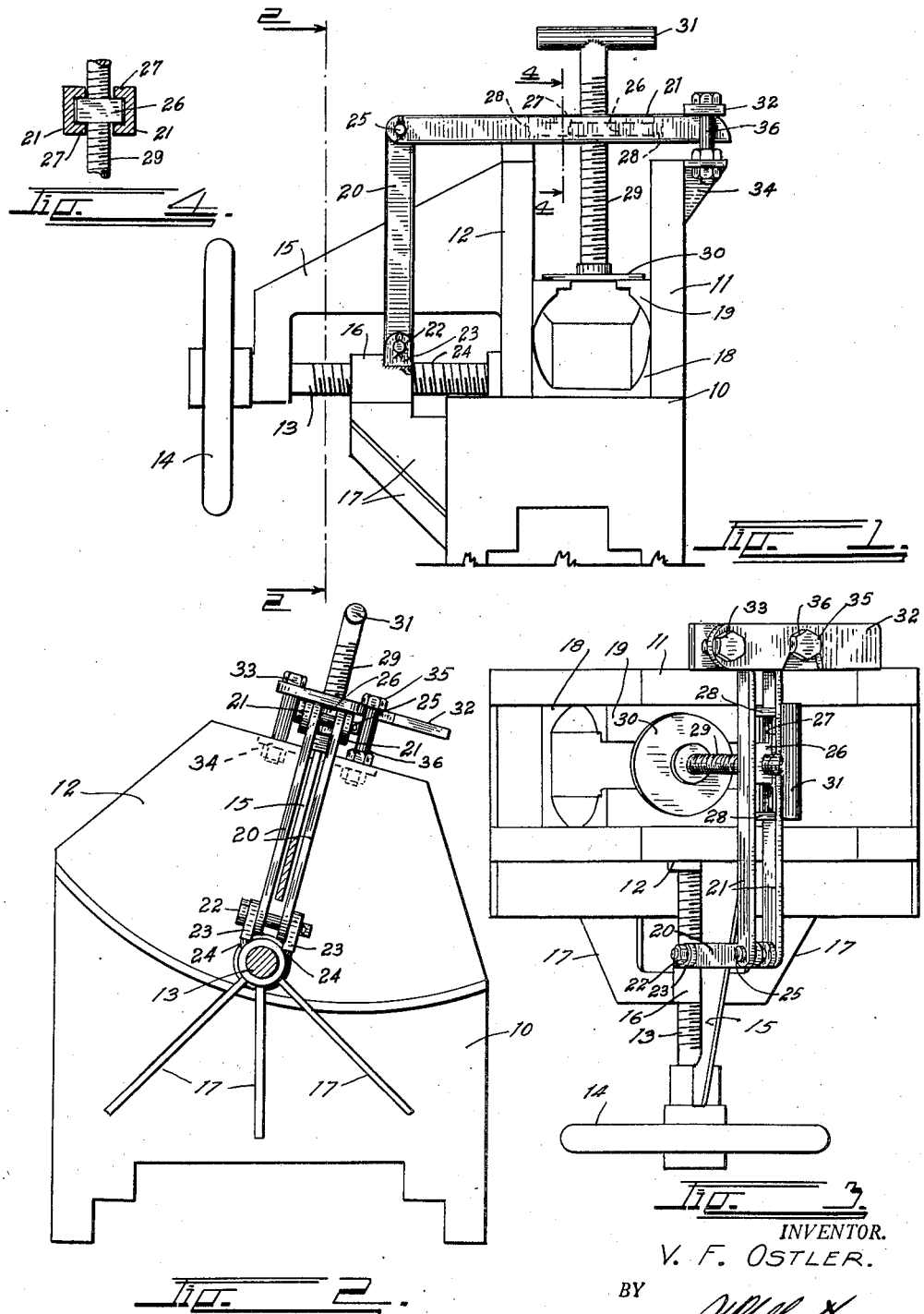
INVENTOR.
V. F. OSTLER.
BY
ATTORNEY.

Patented Mar. 30, 1948

2,438,677

UNITED STATES PATENT OFFICE 2,438,677

TIRE CASING VULCANIZER

Virgil F. Ostler, Denver, Colo., assignor to Lewis Equipment and Supply Company, Denver, Colo.

Application December 29, 1945, Serial No. 638,076

1 Claim. (Cl. 18—18)

1

This invention relates to a clamp for tire vulcanizers, and has for its principal object the provision of a simple and highly efficient clamp, for forcing the bead molds of a conventional casing vulcanizer against a casing, which can be rapidly opened and closed to allow removal of the casing; which will be rigid in construction to withstand the twisting torques subjected by the vise screw; which will be adjustable to differing sizes of casings; and which can be moved into the casing on a relatively straight line so that it may readily be used on small diameter casings.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is an end view of a typical casing vulcanizer, illustrating the improved clamp in place thereon;

Fig. 2 is a vertical section, taken on the line 2—2, Fig. 1;

Fig. 3 is a plan view thereof; and

Fig. 4 is a detail sectional view taken on the line 4—4, Fig. 1.

In the drawing, typical parts of a conventional tire casing vulcanizer are designated by numeral as follows: steam chest 10, fixed vise jaw 11, movable vise jaw 12, vise screw 13, vise screw handle 14, vice screw yoke 15, vice screw nut 16, nut bracket 17, tread mold 18, and bead molds 19.

The improved clamp employs a pair of hinge links 20 and a pair of beam members 21. The lower extremities of the hinge links 20 are hingedly mounted on a mounting pin 22 which is carried in a pair of mounting ears 23. The ears 23 are welded to the vise screw nut 16, as shown at 24, and extend upwardly therefrom, there being one of the links 20 on each side of the vise screw yoke 15. The links 20 terminate on a hinge pin 25, by means of which the beam members 21 are hingedly secured thereto.

The members 21 extend in parallel relation across the top of the vise jaws 11 and 12. A

2 clamp screw nut 26 is positioned between the members 21 and is enclosed between slide guides 27 thereon so that it may be moved longitudinally of the levers 21 but cannot move transversely thereof. Stop blocks 28 are positioned between the members 21 at the extremities of the guides 27 to limit the extreme movement of the nut 26.

A clamp screw 29 is threaded through the nut 26 and terminates at its lower extremity in a pressure plate 30. The upper extremity of the clamp screw 29 is provided with a hand grip 31, by means of which it may be rotated.

Upward movement of the free extremities of the beam members 21 is limited by means of a locking lever 32. The lever 32 is pivoted on a pivot bolt 33 extending from a bracket member 34 welded or otherwise secured to the fixed jaw 11. The lever 32 is provided with a locking notch 35 which can be passed about a locking bolt 36.

In use, a tread mold is placed between the vise jaws and the jaw 12 is clamped against the mold by means of the vise screw 13. The repair of the casing is then placed in the tread mold and the bead molds 19 are slipped in place around the bead of the casing. The beam members 21 are then brought into position over the bead molds and the nut 26 is slid between its guides 27 to bring the clamp screw 29 directly over the medial line of the casing. The lever 32 is then closed over the extremities of the members 21 and the clamp screw 29 is rotated to force the bead molds 19 against the casing.

It is desired to call attention to the double hinge of the clamp. That is, it is hinged first on the pin 22, then on the pin 25. This allows the beam members to be moved directly into the casing on a substantially horizontal line so that there will be no interference from the upper part of the casing, even on small sizes.

It will be noted that the links 20 closely engage each side of the vise screw yoke 15 so that the former are firmly braced by the latter against side-sway and twisting.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

The combination in a casing vulcanizer of a fixed vise jaw; a movable vise jaw; a nut fixed adjacent said movable jaw, said nut and said fixed jaw being on opposite sides of said moveable jaw, a vise screw threaded through said nut into contact with said movable jaw; link means hingedly mounted on said nut and extending upwardly therefrom; a beam hinged to the upper extremity of said link means and extending across both vise jaws; means for clamping the free extremity of said beam to said fixed jaw; and a jack screw extending downwardly from said beam between said jaws.

VIRGIL F. OSTLER.

REFERENCES CITED

The following references are of record in the file of this patent:

UNITED STATES PATENTS

| Number | Name | Date |
|---|---|---|
| 919,391 | Stark | Apr. 27, 1909 |
| 1,524,643 | Whitehouse | Jan. 27, 1925 |
| 1,793,473 | Fredd | Feb. 24, 1931 |